US011738726B2

(12) United States Patent
Satoh et al.

(10) Patent No.: US 11,738,726 B2
(45) Date of Patent: Aug. 29, 2023

(54) VEHICLE BRAKE SYSTEM

(71) Applicants: NISSIN KOGYO CO., LTD., Tomi (JP); VEONEER NISSIN BRAKE SYSTEMS JAPAN CO., LTD., Yokohama (JP); MITSUBISHI JIDOSHA KOGYO KABUSHIKI KAISHA, Tokyo (JP); NTN CORPORATION, Osaka (JP)

(72) Inventors: Hiromasa Satoh, Nagano (JP); Toshihiro Obika, Yokohama (JP); Yusuke Koga, Yokohama (JP); Yasushi Aoki, Yokohama (JP); Hiromitsu Toyota, Tokyo (JP); Haruo Kotera, Tokyo (JP); Tatsuya Yamasaki, Iwata (JP); Yui Masuda, Iwata (JP)

(73) Assignees: MITSUBISHI JIDOSHA KOGYO KABUSHIKI KAISHA, Tokyo (JP); NTN CORPORATION, Osaka (JP); HITACHI ASTEMO UEDA CO., LTD., Nagano (JP)

( * ) Notice: Subject to any disclaimer, the term of this patent is extended or adjusted under 35 U.S.C. 154(b) by 689 days.

(21) Appl. No.: 16/499,146

(22) PCT Filed: Mar. 29, 2018

(86) PCT No.: PCT/JP2018/013435
§ 371 (c)(1),
(2) Date: Sep. 27, 2019

(87) PCT Pub. No.: WO2018/181807
PCT Pub. Date: Oct. 4, 2018

(65) Prior Publication Data
US 2020/0039485 A1     Feb. 6, 2020

(30) Foreign Application Priority Data
Mar. 31, 2017  (JP) .................................. 2017-071349

(51) Int. Cl.
*B60T 8/17*     (2006.01)
*B60T 13/74*    (2006.01)
*B60T 17/22*    (2006.01)

(52) U.S. Cl.
CPC ................ *B60T 8/17* (2013.01); *B60T 13/74* (2013.01); *B60T 17/221* (2013.01); *B60T 2270/402* (2013.01); *B60T 2270/413* (2013.01)

(58) Field of Classification Search
None
See application file for complete search history.

(56) References Cited

U.S. PATENT DOCUMENTS 5,255,962 A   10/1993  Neuhaus et al.
5,458,404 A   10/1995  Fennel et al.
(Continued)

FOREIGN PATENT DOCUMENTS

CN    101134459 A    3/2008
JP    7-9980 A       1/1995
(Continued)

OTHER PUBLICATIONS

English translation of JP 2016124509, Jan. 8, 2015 (Year: 2015).*
(Continued)

*Primary Examiner* — James J Lee
*Assistant Examiner* — David Hatch
(74) *Attorney, Agent, or Firm* — Birch, Stewart, Kolasch & Birch, LLP

(57) ABSTRACT

A vehicle brake system (1) includes a first control device (10) and a second control device (11) that respectively include a master controller (30), a first sub-controller (40), and a second sub-controller (41) that are connected to one another. Each of the master controller (30), the first sub-controller (40), and the second sub-controller (41) includes a braking force calculation unit that calculates braking force
(Continued)

of electric brakes (16a to 16d), and a determination unit that compares braking force calculation results of the controllers to determine whether itself is normal. The determination unit includes an output block section that blocks, when the determination unit determines that any one of the controllers is not normal, an output of the controller that is determined to be not normal.

3 Claims, 3 Drawing Sheets

(56) References Cited

U.S. PATENT DOCUMENTS

| | | | |
|---|---|---|---|
| 5,952,799 A * | 9/1999 | Maisch | B60T 8/321 |
| | | | 318/16 |
| 6,749,269 B1 | 6/2004 | Niwa | |
| 2002/0074854 A1 * | 6/2002 | Fukasawa | B60T 8/4081 |
| | | | 303/122 |
| 2008/0054716 A1 | 3/2008 | Sato et al. | |
| 2010/0268408 A1 * | 10/2010 | Yuki | B60L 3/04 |
| | | | 180/65.21 |
| 2012/0200058 A1 * | 8/2012 | Sekiya | B60T 13/741 |
| | | | 303/2 |
| 2013/0138316 A1 * | 5/2013 | Koyama | B60T 8/1755 |
| | | | 701/70 |
| 2015/0142288 A1 * | 5/2015 | Sato | B60T 7/18 |
| | | | 701/70 |

FOREIGN PATENT DOCUMENTS

| | | |
|---|---|---|
| JP | 2003-220943 A | 8/2003 |
| JP | 2006-219133 A | 8/2006 |
| JP | 2016-124509 A | 7/2016 |
| JP | 2317-43357 A | 3/2017 |
| KR | 10-1708234 B1 | 2/2017 |

OTHER PUBLICATIONS

Chinese Office Action for corresponding Chinese Application No. 201880021614.4, dated Dec. 2, 2021, with English translation.
Extended European Search Report for European Application No. 18775759.6, dated Oct. 28, 2020.
Chinese Office Action and Search Report for Chinese Application No. 201880021614.4, dated Apr. 2, 2021, with English translation.
English Machine Translation of JP-2003-220943 A, dated Aug. 5, 2003.
English Machine Translation of JP-2006-219133 A, dated Aug. 24, 2006.
English Machine Translation of JP-2016-124509 A, dated Jul. 11, 2016.
Japanese Office Action for Japanese Application No. 2019-510181, dated Apr. 13, 2021, with English translation.
Chinese Office Action and Search Report for Chinese Application No. 201880021614.4 dated Sep. 8, 2021, with English translation.

* cited by examiner

VEHICLE BRAKE SYSTEM

TECHNICAL FIELD

The present invention relates to a vehicle brake system provided with an electric brake.

BACKGROUND ART

For an electrical control system of a vehicle brake system, there has been suggested a system including two central modules (central control devices), four wheel modules (wheel control devices), and an input device (PTL 1). The two central modules each control two wheel modules. The two central control devices monitor each other, and the central control device, when a failure occurs, disconnects the wheel control device from a power supply. The system does not monitor a wheel control device provided with an antilock function or an antiskid function.

CITATION LIST

Patent Literature

PTL 1: JP-A-07-009980

SUMMARY OF INVENTION

Technical Problem

An object of the invention is to provide a vehicle brake system provided with an electric brake, which is a vehicle brake system with high reliability.

Solution to Problem

The invention has been made to achieve at least part of the above object, and can be achieved as the following embodiments or the application examples.

<1>

According to one embodiment of the invention, there is provided a vehicle brake system including:

an electric brake including at least one unit of an electric actuator that presses a friction pad toward a rotor side;

a driver that drives the electric actuator; and a control device, the control device including at least three units of controllers connected to one another, each of the controllers including a driver control unit that controls the driver, and a braking force calculation unit that calculates braking force of the electric brake, at least one of the controllers further including a determination unit that compares braking force calculation results of the controllers to determine whether the controllers are normal or not, and the determination unit including an output block section that blocks, when the determination unit determines that any one of the controllers is not normal, an output of the one of the controllers that is determined to be not normal.

According to one embodiment of the above vehicle brake system, the vehicle brake system includes at least three units of controllers including the braking force calculation unit. At least one of the three controllers compares the braking force calculation results of each of the controllers to determine whether the controllers are normal, and blocks an output of the controller that is determined to be not normal, thus improving reliability of the braking force calculation results and achieving redundancy of the system.

<2>

In one embodiment of the above vehicle brake system, the control device may include a first control device including at least one unit of the controllers, and a second control device including at least one unit of the controllers.

According to one embodiment of the above vehicle brake system, at least three units of controllers are mounted on separate control devices to improve redundancy of the system.

<3>

In one embodiment of the above vehicle brake system, each of the controllers may include a self-determination unit that determines whether the controller itself is normal or not based on a calculation result of the braking force calculation unit, and further include a section that blocks an output of the controller that is determined to be not normal by self-determination.

According to one embodiment of the above vehicle brake system, each of the controllers determines whether itself is normal based on a braking force calculation result of its own, and blocks an output of the controller that is determined to be not normal by self-determination, thus further improving reliability of the braking force calculation results.

DESCRIPTION OF EMBODIMENTS

Preferred embodiments of the invention will be described below in detail with reference to the drawings. The drawings used in the description are provided for convenience of explanation. Note that the embodiments described below do not unduly limit the contents of the invention described in the claims. Moreover, all of the elements described below are not necessarily essential requirements of the invention.

A vehicle brake system according to an embodiment of the invention includes an electric brake including at least one unit of an electric actuator that presses a friction pad toward a rotor side, a driver that drives the electric actuator, and a control device. The control device includes at least three units of controllers connected to one another. The controller includes a driver control unit that controls the driver, and a braking force calculation unit that calculates braking force of the electric brake. At least one of the controllers further includes a determination unit that compares braking force calculation results of the controllers to determine whether a controller is normal or not. The determination unit includes an output block section that blocks, when the determination unit determines that any one of the controllers is not normal, an output of the controller that is determined to be not normal.

1. Vehicle Brake System

Figure 1:
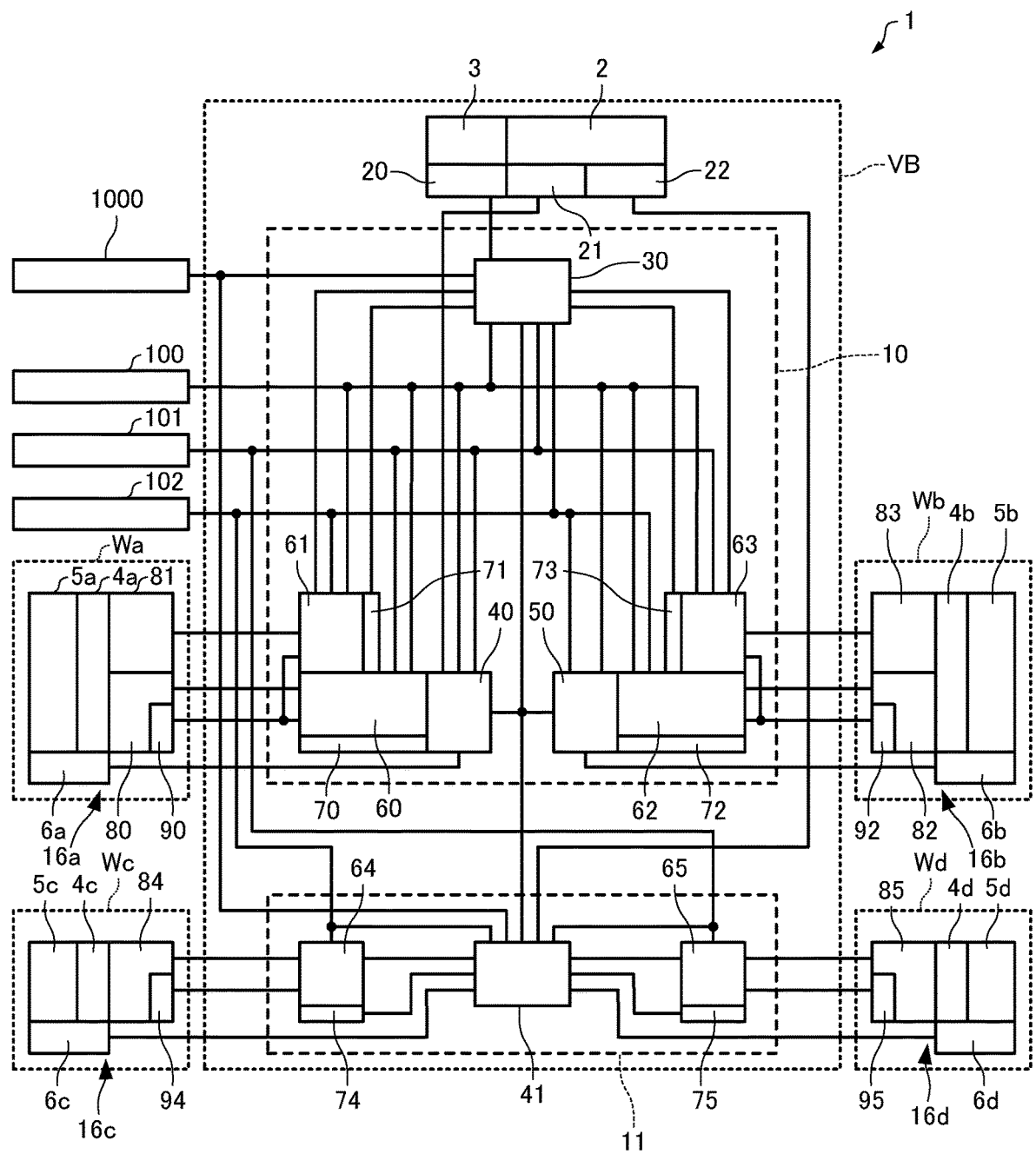
FIG. 1 is an overall configuration diagram illustrating a vehicle brake system according to an embodiment of the invention.
Figure 2:
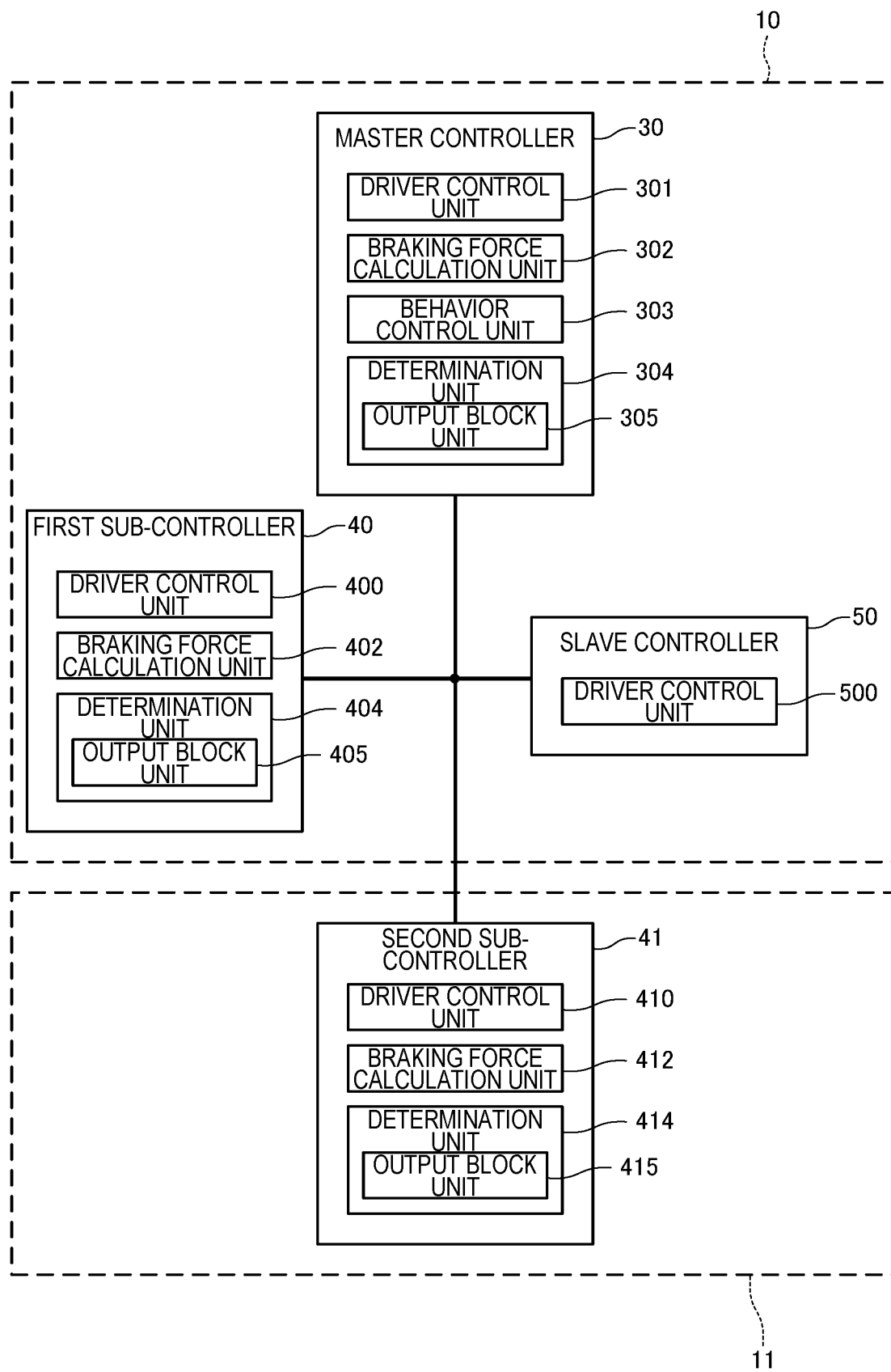
FIG. 2 is a block diagram illustrating a master controller, first and second sub-controllers, and a slave controller of a vehicle brake system according to an embodiment of the invention.

A vehicle brake system 1 according to an embodiment of the invention will be described in detail with reference to FIGS. 1 and 2. FIG. 1 is an overall configuration diagram illustrating the vehicle brake system 1 according to the embodiment. FIG. 2 is a block diagram illustrating a master controller 30, first and second sub-controllers 40 and 41, and a slave controller 50 of the vehicle brake system 1 according to the embodiment.

As illustrated in FIG. 1, the vehicle brake system 1 includes electric brakes 16a to 16d including at least one unit of motors 80 to 85 being an electric actuator that presses a non-illustrated friction pad toward a non-illustrated rotor side, control devices (10 and 11) including drivers 60 to 65 that drive the motors 80 to 85 and a plurality of controllers (the master controller 30, the first sub-controller 40, the second sub-controller 41, the slave controller 50) connected to one another. The non-illustrated rotors, which are provided to the wheels Wa to Wd of a vehicle VB being a four-wheeled vehicle, rotate integrally with the wheels Wa to Wd. Note that the vehicle VB is not limited to a four-wheeled vehicle. Further, a plurality of motors may be provided to one electric brake, or a plurality of electric brakes may be provided to one wheel.

1-1. Electric Brake

The electric brake 16a provided to the wheel Wa at the front-wheel left-side (FL) includes a brake caliper 5a, the motors 80 and 81 fixed to the brake caliper 5a via a decelerator 4a, and a load sensor 6a that detects a load applied from the motors 80 and 81 to the non-illustrated friction pads. The motor 80 includes a rotation angle sensor 90 that detects the relative position of the rotation axis with respect to the stator of its own. The motor 81, which is coaxial with the motor 80, does not need a rotation angle sensor. The detection signal from the load sensor 6a is input into the first sub-controller 40, and the detection signal from the rotation angle sensor 90 is input into the first sub-controller 40 and the master controller 30 via the drivers 60 and 61.

The electric brake 16b provided to the wheel Wb at the front-wheel right-side (FR) includes a brake caliper 5b, the motors 82 and 83 fixed to the brake caliper 5b via a decelerator 4b, and a load sensor 6b that detects a load applied from the motors 82 and 83 to the non-illustrated friction pads. The motor 82 includes a rotation angle sensor 92 that detects the relative position of the rotation axis with respect to the stator of its own. The motor 83, which is coaxial with the motor 82, does not need a rotation angle sensor. The detection signal from the load sensor 6b is input into the slave controller 50, and the detection signal from the rotation angle sensor 92 is input into the slave controller 50 and the master controller 30 via the drivers 62 and 63.

The electric brake 16c provided to the wheel Wc at the rear-wheel left-side (RL) includes a brake caliper 5c, the motor 84 fixed to the brake caliper 5c via a decelerator 4c, and a load sensor 6c that detects a load applied from the motor 84 to the non-illustrated friction pads. The motor 84 includes a rotation angle sensor 94 that detects the relative position of the rotation axis with respect to the stator of its own. The detection signal from the load sensor 6c is input into the second sub-controller 41, and the detection signal from the rotation angle sensor 94 is input into the second sub-controller 41 via the driver 64.

The electric brake 16d provided to the wheel Wd at the rear-wheel right-side (RR) includes a brake caliper 5d, the motor 85 fixed to the brake caliper 5d via a decelerator 4d, and a load sensor 6d that detects a load applied from the motor 85 to the non-illustrated friction pads. The motor 85 includes a rotation angle sensor 95 that detects the relative position of the rotation axis with respect to the stator of its own. The detection signal from the load sensor 6d is input into the second sub-controller 41, and the detection signal from the rotation angle sensor 95 is input into the second sub-controller 41 via the driver 65.

The brake calipers 5a to 5d are formed in a substantially C-shape, and are integrally provided with a claw portion extending to the opposite side across a non-illustrated rotor.

The decelerators 4a to 4d, which is fixed to the brake calipers 5a to 5d, transmit torque generated by the rotation of the motors 80 to 85 to non-illustrated linear motion mechanisms that are built into the brake calipers 5a to 5d.

The linear motion mechanism can employ a publicly known mechanism in the electric brake. The linear motion mechanism converts the rotation of the motors 80 to 85 into a linear motion of the friction pads via the decelerators 4a to 4d. The linear motion mechanism presses the friction pads against the rotor to suppress the rotation of the wheels Wa to Wd.

The motors 80 to 85 can employ a publicly known electric motor, which is, for example, a brushless DC motor. Driving of the motor 80 to 85 causes the friction pads to move via the decelerators 4a to 4d and the linear motion mechanisms. An example will be described in which a motor is employed as the electric actuator, however, other publicly known actuators may be employed without being limited thereto.

1-2. Input Device

The vehicle brake system 1 includes a brake pedal 2 being an input device, and a stroke simulator 3 connected to the brake pedal 2. The brake pedal 2 includes a second stroke sensor 21 and a third stroke sensor 22 that detect the operation amount of the brake pedal 2 of the driver. The stroke simulator 3 includes a first stroke sensor 20 that detects the operation amount of the brake pedal 2.

Each of the stroke sensors 20 to 22 mutually independently generates an electrical detection signal corresponding to a depression stroke and/or a depression force being a kind of the operation amount of the brake pedal 2. The first stroke sensor 20 sends the detection signal to the master controller 30 to be described below. The second stroke sensor 21 sends the detection signal to the first sub-controller 40 to be described below. The third stroke sensor 22 sends the detection signal to the second sub-controller 41 to be described below.

The vehicle VB includes, as an input device to the vehicle brake system 1, a plurality of control devices (hereinafter referred to as "other control devices 1000") provided in systems other than the vehicle brake system 1. The other control devices 1000 are connected by Controller Area Network (CAN) to the master controller 30 of a first control device 10 and to the second sub-controller 41 of the second control device 11 to communicate information about brake operation to each other.

1-3. Control Device

A control device includes the first control device 10 and the second control device 11. The first control device 10 is disposed at a predetermined position on the vehicle VB independently from the second control device 11. The first control device 10 and the second control device 11 are electronic control units (ECUs). Each of the first control device 10 and the second control device 11 is housed in a synthetic resin chassis. Accordingly, redundancy is achieved by the two control devices, which are the first control device 10 and the second control device 11. Note that an example is described in which two control devices are used, but one control device may be used in view of the disposition in the vehicle VB, or three or more may be used to further enhance redundancy.

The first control device 10 and the second control device 11 are connected via CAN, whereby communication is performed. The communication via CAN performs unidirectional and bidirectional information transmissions. Note that a communication between ECUs can be performed without being limited to, via CAN.

The first control device 10 and the second control device 11 are electrically connected to three batteries 100, 101, and 102 that are independent from one another. The batteries 100, 101, and 102 supplies electric power to electronic components included in the first control device 10 and the second control device 11. The batteries 100, 101, and 102 of the vehicle brake system 1 are arranged in predetermined positions in the vehicle VB.

The first control device 10 includes, at least, one unit of the master controller 30 and one unit of the first sub-controller 40, and the second control device 11 includes at least one unit of a sub-controller (the second sub-controller 41). The first control device 10 is mounted with the master controller 30 and the first sub-controller 40 to improve redundancy and reliability in the first control device 10.

The first control device 10 further includes the slave controller 50. A cost reduction can be achieved by using the slave controller 50, which is inexpensive. Note that a sub-controller can be provided in place of the slave controller 50.

The master controller 30, the first and second sub-controllers 40 and 41, and the slave controller 50 are microcomputers.

The first control device 10 includes the master controller 30, the first sub-controller 40, and the slave controller 50. The first control device 10, even while achieving redundancy by using a plurality of controllers, can achieve cost reduction by not being mounted with a plurality of master controllers, which are relatively expensive. The master controller 30 needs high performance to provide a behavior control unit 303 (the behavior control unit 303 will be described below), and this causes the master controller 30 to become a relatively expensive controller compared to the first and second sub-controllers 40 and 41.

As illustrated in FIGS. 1 and 2, the master controller 30 includes a driver control unit 301 that controls the drivers 61 and 63, a braking force calculation unit 302 that calculates braking force of the electric brakes 16a to 16d, and the behavior control unit 303 that controls behaviors of the vehicle VB.

The first sub-controller 40 includes a driver control unit 400 that controls the driver 60, and a braking force calculation unit 402 that calculates braking force of the electric brakes 16a to 16d. The second sub-controller 41 includes a driver control unit 410 that controls the drivers 64 and 65, and a braking force calculation unit 412 that calculates braking force of the electric brakes 16a to 16d. The first and second sub-controllers 40 and 41, due to the lack of the behavior control unit, can employ a microcomputer that is less expensive than the master controller 30, thus contributing to a cost reduction.

The slave controller 50, which does not include a braking force calculation unit, includes a driver control unit 500 that controls the driver 62 based on the braking force calculation results of at least one of the master controller 30 and the first and second sub-controllers 40 and 41. The slave controller 50, which does not include a braking force calculation unit, can employ a relatively inexpensive microcomputer compared to the first and second sub-controllers 40 and 41.

The drivers 60 to 65 control the drives of the motors 80 to 85. Specifically, the driver 60 controls the drive of the motor 80, the driver 61 controls the drive of the motor 81, the driver 62 controls the drive of the motor 82, the driver 63 controls the drive of the motor 83, the driver 64 controls the drive of the motor 84, and the driver 65 controls the drive of the motor 85. The drivers 60 to 65 control the motors 80 to 85 by sinusoidal drive scheme, for example. The drivers 60 to 65 may also control, for example, by square-wave current, without being limited to sinusoidal drive scheme.

The drivers 60 to 65 include a power supply circuit and an inverter that supply electric power being commensurate with the commands from the driver control units 301, 400, 410, and 500 to the motors 80 to 85.

The braking force calculation units 302, 402, and 412 calculate braking force (a required value) based on a detection signal from each of the stroke sensors 20 to 22, which is commensurate with the operation amount of the brake pedal 2. The braking force calculation unit 302, 402, and 412 can also calculate braking force (a required value) based on a signal from other control devices 1000.

The driver control units 301, 400, 410, and 500 control the drivers 60 to 65 based on the braking forces (the required values) calculated by the braking force calculation units 302, 402, and 412, detection signals from the load sensors 6a to 6d, and detection signals from the rotation angle sensors 90, 92, 94, and 95. The drivers 60 to 65 supply driving sinusoidal currents to the motors 80 to 85 in accordance with commands from the driver control units 301, 400, 410, and 500. The currents supplied to the motors 80 to 85 are detected by current sensors 70 to 75.

The behavior control unit 303 outputs signals for controlling behaviors of the vehicle VB to the driver control units 301, 400, 410, and 500. The behaviors above are other than simple braking behaviors in response to the operation of the brake pedal 2 of normal, that are, for example, Antilock Brake System (ABS), which is a control for preventing locking of the wheels Wa to Wd, Traction Control System (TCS), which is a control for suppressing slippage of the wheels Wa to Wd, and a behavior stabilization control, which is a control for suppressing sideslip of the vehicle VB.

The master controller 30 and the first and second sub-controllers 40 and 41 include determination units 304, 404, and 414 that compare the braking force calculation results of the controllers to determine (diagnose) whether each of the controllers is normal.

The determination units 304, 404, and 414 compare the calculation result of the braking force calculation unit 302 of the master controller 30, the calculation result of the braking force calculation unit 402 of the first sub-controller 40, and the calculation result of the braking force calculation unit 412 of the second sub-controller 41 to determine, by majority decision, whether each of the controllers is normal. For example, in a case where the calculation result of the braking force calculation unit 302 is solely different from the other calculation results (the calculation results of the braking force calculation units 402 and 412) (for example, when the difference between the calculation result from the braking force calculation unit 302 and the other calculation results exceeds a predetermined threshold value, or when the calculation result from the braking force calculation unit 302 cannot be acquired), the determination units 304, 404, and 414 determine the master controller 30 to be not normal and determine the first and second sub-controllers 40 and 41 to be normal. Further, when the calculation result of the braking force calculation unit 402 is solely different from the other calculation results (the calculation results of the braking force calculation units 302 and 412), the determination units 304, 404, and 414 determine the first sub-controller 40 to be not normal, and determine the master controller 30 and the second sub-controller 41 to be normal. Furthermore, when the calculation result of the braking force calculation unit 412 is solely different from the other calculation results (the calculation results of the braking force calculation units 302 and 402), the determination units 304, 404, and 414 determine the second sub-controller 41 to be not normal, and determine the master controller 30 and the first sub-controller 40 to be normal.

The driver control units each employ the calculation result of the controller that is determined to be normal as the braking force, and control the drivers based on the calculation result. For example, when the master controller 30 is determined to be not normal, the driver control unit 400 controls the driver 60 based on the calculation result of the braking force calculation unit 402, the driver control unit 410 controls the drivers 64 and 65 based on the calculation result of the braking force calculation unit 412, and the driver control unit 500 controls the driver 62 based on the calculation result of the braking force calculation unit 402 or the braking force calculation unit 412. Further, when the first sub-controller 40 is determined to be not normal, the driver control unit 301 controls the drivers 61 and 63 based on the calculation result of the braking force calculation unit 302, and the driver control unit 410 controls the drivers 64 and 65 based on the calculation result of the braking force calculation unit 412, and the driver control unit 500 controls the driver 62 based on the calculation result of the braking force calculation unit 302 or the braking force calculation unit 412. Furthermore, when the second sub-controller 41 is determined to be not normal, the driver control unit 301 controls the drivers 61 and 63 based on the calculation result of the braking force calculation unit 302, and the driver control unit 400 controls the driver 60 based on the calculation result of the braking force calculation unit 402, and the driver control unit 500 controls the driver 62 based on the calculation result of the braking force calculation unit 302 or the braking force calculation unit 402.

The determination units 304, 404, and 414 include output block units 305, 405, and 415 (output block section) that block an output of a controller that is determined to be not normal. The output of the controller includes, for example, a control signal (command) to the driver or a calculation result of its own for the other controllers. For example, the output block units 305, 405, and 415, when the master controller 30 is determined to be not normal, block a supply of electric power to the master controller 30 (or the drivers 61 and 63), and when the first sub-controller 40 is determined to be not normal, block a supply of electric power to the first sub-controller 40 (or the drivers 60), and when the second sub-controller 41 is determined to be not normal, block a supply of electric power to the second sub-controller 41 (or the drivers 64 and 65), to thereby prevent a driver from being controlled by a controller that is determined to be not normal.

Note that, the determination units 304, 404, and 414, when the output of the controller that is determined to be not normal and thereby the number of the controllers (a master controller and sub-controllers) that is functioning normally becomes two or less, become unable to perform the determination of normality by majority decision, and thus the determination units 304, 404, and 414 do not perform subsequent processing for comparing the calculation results of the controllers.

In the embodiment, the master controller 30 and the first and second sub-controllers 40 and 41 each include a determination unit, however, it suffices that at least one of the master controller 30 and the first and second sub-controllers 40 and 41 includes the determination unit. Note that when the master controller 30 and the first and second sub-controllers 40 and 41 each include a determination unit, these determination units may sequentially determine the normality of each of the controllers (switching, in a predetermined order, the determination units for determining the normality of each of the controllers). For example, the switching is performed such that the determination unit 304 of the master controller 30 firstly determines the normality, then the determination unit 404 of the first sub-controller 40 determines the normality, then the determination unit 414 of the second sub-controller 41 determines the normality, and then the determination unit 304 of the master controller 30 determines the normality again. Note that the switching may be performed such that a determination unit is switched to the next determination unit each time when the number of counts of the determinations of normality performed by the determination unit reaches a predetermined number, or is switched to the next determination unit each time when a predetermined time is elapsed. This allows distribution of the processing loads of the master controller 30 and the first and second sub-controllers 40 and 41, to thus elongate the lifespan of the controllers.

According to the vehicle brake system 1, the vehicle brake system 1 includes at least three units of controllers (a master controller and sub-controllers) including the braking force calculation unit, where at least one of the three controllers compares the braking force calculation results of the controllers to determine whether each of the controllers is normal, and blocks an output of the controller that is determined to be not normal, thus improving reliability of the braking force calculation results and achieving redundancy of the vehicle brake system 1.

According to the vehicle brake system 1, at least three units of controllers are mounted on separate control devices (the first control device 10 and the second control device 11) to improve redundancy of the vehicle brake system 1, and the first control device 10 and the second control device 11 can individually control the front and rear wheels to improve the controllability.

2. Modified Example

Figure 3:
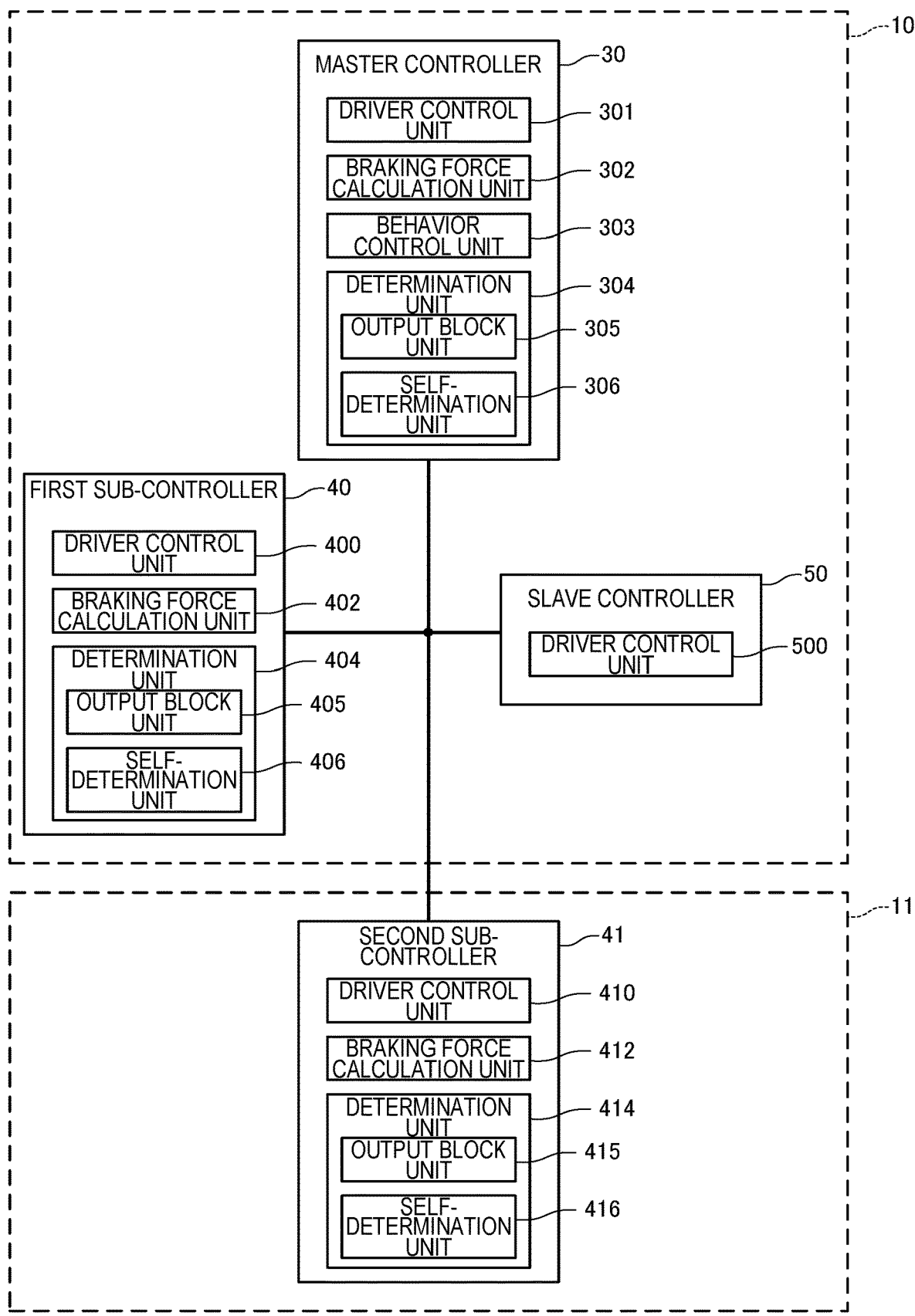
FIG. 3 is a block diagram illustrating a master controller, first and second sub-controllers, and a slave controller of a vehicle brake system according to a modified example.

A vehicle brake system according to a modified example will be described with reference to FIG. 3. FIG. 3 is a block diagram illustrating a master controller 30, first and second sub-controllers 40 and 41, and a slave controller 50 of a vehicle brake system according to a modified example. In the following descriptions, the same components as in the vehicle brake system 1 of FIG. 2 are denoted by the same reference signs in FIG. 3, and detailed descriptions thereof will be omitted.

As illustrated in FIG. 3, in the vehicle brake system according to the modified example, the determination units 304, 404, and 414 further include self-determination units 306, 406, and 416 that determine whether itself is normal based on the calculation results of the braking force calculation units 302, 402, and 412 of its own. For example, the self-determination units 306, 406, and 416 compare a plurality of calculation results from the braking force calculation units 302, 402, and 412 of its own to self-determine whether itself is normal. The output block units 305, 405, and 415 block an output of a controller that is determined to be not normal by self-determination.

According to the vehicle brake system of the modified example, each of the controllers determines whether itself is normal based on the calculation result of the braking force calculation unit of its own, and blocks an output of the controller that is determined to be not normal by self-determination, thus further improving reliability of the braking force calculation results.

Note that when the master controller 30 and the first and second sub-controllers 40 and 41 have self-diagnostic functions such as lock-step scheme, the determination units 304, 404, and 414 may determine whether each of the controllers is normal based on the self-diagnostic result in addition to the calculation results of the controllers.

The invention is not limited to the embodiments described above, and various modifications are possible. For example, the invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

REFERENCE SIGNS LIST

1 Vehicle brake system
2 Brake pedal
3 Stroke simulator
4a to 4d Decelerator
5a to 5d Brake caliper
6a to 6d Load sensor
10 First control device
11 Second control device
16a to 16d Electric brake
20 First stroke sensor
21 Second stroke sensor
22 Third stroke sensor
30 Master controller
301 Driver control unit
302 Braking force calculation unit
303 Behavior control unit
304 Determination unit
305 Output block unit
306 Self-determination unit
40 First sub-controller
400 Driver control unit
402 Braking force calculation unit
404 Determination unit
405 Output block unit
406 Self-determination unit
41 Second sub-controller
410 Driver control unit
412 Braking force calculation unit
414 Determination unit
415 Output block unit
416 Self-determination unit
50 Slave controller
500 Driver control unit
60 to 65 Driver
70 to 75 Current sensor
80 to 85 Motor
90, 92, 94, 95 Rotation angle sensor
100 to 102 Battery
1000 Other control devices
VB Vehicle
Wa to Wd Wheel

The invention claimed is:

1. A vehicle brake system comprising:
an electric brake including at least one unit of an electric actuator that presses a friction pad toward a rotor side;
a first stroke sensor that independently detects an operation amount of a brake pedal;
a second stroke sensor that independently detects the operation amount of the brake pedal;
a third stroke sensor that independently detects the operation amount of the brake pedal;
a driver that drives the electric actuator; and
a control device,
the control device including at least three controllers including a first controller that receives the operation amount detected by the first stroke sensor, a second controller that receives the operation amount detected by the second stroke sensor, and a third controller that receives the operation amount detected by the third stroke sensor, connected to one another,
each of the first, second, and third controllers including a driver control unit that controls the driver, and a braking force calculation unit that calculates braking force of the electric brake,
at least one of the first, second, and third controllers further including a determination unit that compares braking force calculation results of the first, second, and third controllers to determine whether the first, second, and third controllers are normal or not, and
the determination unit including an output block section that blocks, when the determination unit determines that any one of the first, second, and third controllers is not normal, an output of the one of the first, second, and third controllers that is determined to be not normal, and
the control device further including a slave controller having only another driver control unit that controls the driver based on braking force calculation results of at least one of the first, second, and third controllers.

2. The vehicle brake system according to claim 1, wherein the control device includes a first control device including at least one unit of the first, second, and third controllers, and a second control device including at least one unit of remaining controllers.

3. The vehicle brake system according to claim 1, wherein each of the first, second, and third controllers includes a self-determination unit that determines whether a corresponding controller itself is normal or not based on a calculation result of the braking force calculation unit, and further includes a section that blocks an output of a corresponding controller that is determined to be not normal by self-determination.

* * * * *

UNITED STATES PATENT AND TRADEMARK OFFICE
CERTIFICATE OF CORRECTION

PATENT NO. : 11,738,726 B2  
APPLICATION NO. : 16/499146  
DATED : August 29, 2023  
INVENTOR(S) : Hiromasa Satoh et al.

Page 1 of 1

It is certified that error appears in the above-identified patent and that said Letters Patent is hereby corrected as shown below:

On the Title Page  
(73) include the following first Assignee:  
--Hitachi Astemo, Ltd., Nagano (JP)--

Signed and Sealed this  
Twenty-ninth Day of July, 2025

Coke Morgan Stewart  
*Acting Director of the United States Patent and Trademark Office*